United States Patent [19]

Markert

[11] Patent Number: 5,452,769
[45] Date of Patent: Sep. 26, 1995

[54] FOUR IN ONE GARDENING TOOL

[76] Inventor: Randall S. Markert, Rte. 38, Box 460C, San Antonio, Tex. 78211

[21] Appl. No.: 130,742

[22] Filed: Oct. 4, 1993

[51] Int. Cl.⁶ .................................................. A01B 1/20
[52] U.S. Cl. ........................ 172/380; 172/378; 172/372; 56/400.05; 56/400.15
[58] Field of Search ...................... 172/371, 375, 172/380, 381, 378, 372; 56/400.04, 400.05, 400.06, 400.14, 400.15; 294/49, 51

[56] References Cited

U.S. PATENT DOCUMENTS

| | | | |
|---|---|---|---|
| D. 230,247 | 2/1974 | Parry | 172/375 |
| D. 253,807 | 1/1980 | Baylis | 172/375 |
| 1,006,819 | 10/1911 | Adams | 172/375 |
| 1,798,036 | 3/1931 | Schulz | 172/380 |
| 2,080,763 | 5/1937 | Cox | 172/375 |
| 2,536,180 | 1/1951 | Hines | 172/375 |
| 2,795,923 | 6/1957 | Kapuczin | 56/400.05 |
| 4,214,538 | 7/1980 | Druskin et al. | |
| 4,336,845 | 6/1982 | Kolb | |
| 5,004,053 | 4/1991 | Martell | |
| 5,025,621 | 6/1991 | DeMarco | 56/400.05 |
| 5,226,647 | 7/1993 | Notarmuzi | 172/380 |

*Primary Examiner*—Dennis L. Taylor
*Assistant Examiner*—Spencer Warnick
*Attorney, Agent, or Firm*—Richard L. Miller

[57] ABSTRACT

A four in one gardening tool is provided which consists of a scooped blade, with a handle assembly extending upwardly at an angle from a bent central area of the scooped blade. A plurality of teeth extend at an angle downwardly from a first side of the scooped blade. The teeth are used primarily for removing a multiplicity of small weeds. A straight portion having a cutting edge extends along a second side of the scooped blade. The straight portion is used primarily for hoeing. A first pointed portion having a cutting edge extends from a first chord of the scooped blade. The first pointed portion is used primarily for removing large weeds and rocks. A second pointed portion having a cutting edge extends from a second chord of the scooped blade. The second pointed portion is used primarily for cutting a small furrow in the ground.

4 Claims, 1 Drawing Sheet

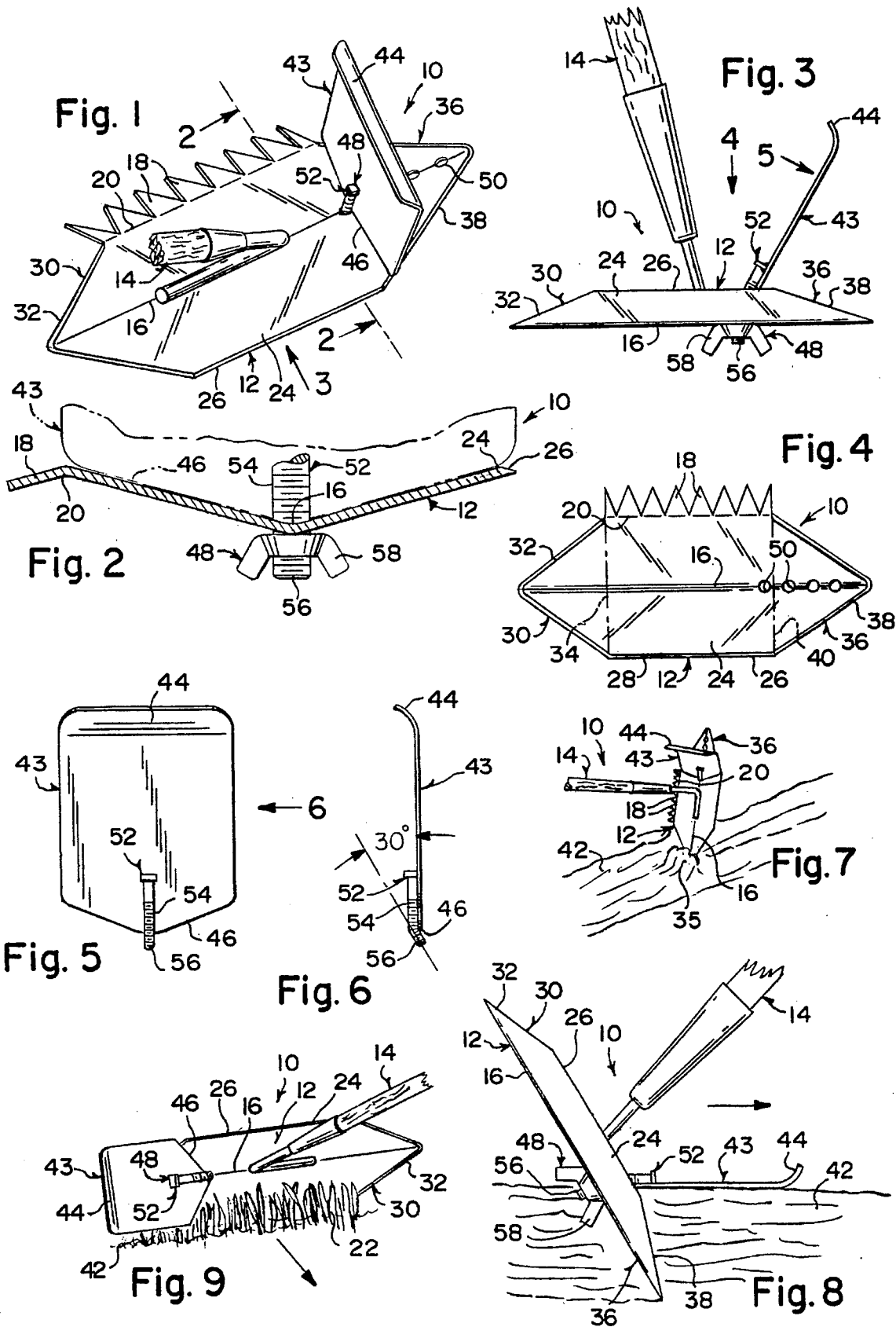

FOUR IN ONE GARDENING TOOL

BACKGROUND OF THE INVENTION

The instant invention relates generally to cultivating implements and more specifically it relates to a four in one gardening tool.

Numerous cultivating implements have been provided in prior art that are each adapted to perform a multitude of functions within a single unit. For example, U.S. Pat. Nos. 4,214,538 to Druskin et al.; 4,336,845 to Kolb and 5,004,053 to Martell all are illustrative of such prior art. While these units may be suitable for the particular purpose to which they address, they would not be as suitable for the purposes of the present invention as heretofore described.

SUMMARY OF THE INVENTION

A primary object of the present invention is to provide a four in one gardening tool that will overcome the shortcomings of the prior art devices.

Another object is to provide a four in one gardening tool which will replace a substantial amount of individual cultivating implements, so that a person only needs the gardening tool.

An additional object is to provide a four in one gardening tool that is rugged in construction, so that it can be utilized by the person over a long period of time.

A further object is to provide a four in one gardening tool that is simple and easy to use.

A still further object is to provide a four in one gardening tool that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is an enlarged diagrammatic perspective view of the instant invention with the handle broken away;

FIG. 2 an enlarged diagrammatic cross sectional view taken along line 2—2 in FIG. 1;

FIG. 3 is a side elevational view taken in the direction of arrow 3 in FIG. 1;

FIG. 4 is a top plan view taken in the direction of arrow 4 in FIG. 3 of just the blade per se with the handle and skid removed for clarity;

FIG. 5 is an enlarged elevational view taken in the direction of arrow 5 in FIG. 3 of the skid per se;

FIG. 6 is a side elevational view taken in the direction of arrow 6 in FIG. 5;

FIG. 7 illustrates the instant invention being used to remove a large weed or rock;

FIG. 8 illustrates the instant invention being used to cut a small furrow when setting a planting depth; and FIG. 9 illustrates the instant invention being used to remove a multiplicity of small weeds.

DETAILED DESCRIPTION OF THE PREFERRED EMBODIMENTS

Turning now descriptively to the drawings, in which similar reference characters denote similar elements throughout the several views, FIGS. 1 to 4 and 7 to 9 illustrate a four in one gardening tool 10 which consists of a scooped blade 12, with a handle assembly 14 extending upwardly at an angle from a bent central area 16 of the scooped blade 12. The scooped blade is generally hexagonal and a plurality of teeth 18 extended at an angle downwardly from a first side 20 of the scooped blade 12. The teeth 18 are used primarily for removing a multiplicity of small weeds 22, as shown in FIG. 9. A straight portion 24 having a cutting edge 26 extends along a second side 28 of the scooped blade 12. The straight portion 24 is used primarily for hoeing. A first pointed portion 30 having a cutting edge 32, extends from a first chord 34 of the scooped blade 12. The first pointed portion 30 is used primarily for removing large weeds and rocks 35, as shown in FIG. 7. A second pointed portion 36 having a cutting edge 38, extends from a second chord 40 of the scooped blade 12. The second pointed portion 36 is used primarily for cutting a small furrow in the ground 42.

The scooped blade 12 is generally hexagonal with the first and second sides 20 and 28 of the scooped blade longer than the chords 34 and 40. The scooped blade 12, the teeth 18, the straight portion 24, the first pointed portion 30 and the second pointed portion 36 are formed of a single integral piece of rigid material typically metal.

As shown in FIGS. 1 to 3 and 5 to 9, a substantially flat skid 43 is provided having a bent upper edge 44 and a curved lower edge 46. A structure 48 is for adjustably mounting the curved lower edge 46 within the scooped blade 12, adjacent the second pointed portion 36. The skid 43 with the bent upper edge 44 will extend outwardly at an angle therefrom to lie flat upon the ground 42 for setting a planting depth when the second pointed portion 36 is used for cutting the small furrow in the ground 42.

The adjustable mounting structure 48 includes the scooped blade 12 having a plurality of holes 50, spaced apart along the bent central area 16 between the handle assembly 14 and tip of the second pointed portion 36. A bolt 52 having a threaded shank 54 with a bent distal end 56 is provided. The bolt 52 is affixed to an inner surface of the skid 43 adjacent the curved lower edge 46. The bent distal end 56 extends below the curved lower edge 46, to fit into anyone of the holes 50. A wing nut 58 engages with the bent distal end 56 of the bolt 52, to retain the skid 43 to the scooped blade 12.

OPERATION OF THE INVENTION

The four in one gardening tool can be used in the following four ways.

1. As in FIG. 7 which shows the scooped blade 12 oriented such that the first pointed portion 30 extends downwardly into the ground 42 to remove large weeds and rocks 35;

2. As in FIG. 8 which shows the scooped blade 12 oriented such that the second pointed portion 36 extends downwardly into the ground 42 with the skid 43 flat upon the ground 42, to set a planting depth and cut a small furrow in the ground 42;

3. As in FIG. 9 which shows the scooped blade 12 oriented such that the teeth 18 extend downwardly into the ground 42 to remove small weeds 22; and 4. The scooped blade 12 can also be oriented such that the straight portion 24 engages the ground to be used for hoeing, similar to FIG. 9 but with the teeth 18 facing upwardly.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A four in one gardening tool which comprises:
    a) a generally hexagonal scooped blade having first and second, elongate, opposite sides and first and second pointed opposite end portions extending from first and second chords, respectively, said first and second sides being longer than said first and second chords;
    b) a handle assembly extending upwardly at an angle from a bent central area of said scooped blade;
    c) a plurality of teeth provided on the first side of said scooped blade and extending at an angle downwardly therefrom said teeth used primarily for removing a multiplicity of small weeds;
    d) a straight portion having a cutting edge extending along the second side of said scooped blade, said straight portion used primarily for hoeing;
    e) a cutting edge extending along the first pointed portion of said scooped blade, said first pointed portion being used primarily for removing a large weed and a rock;
    f) a cutting edge extending along the second pointed portion of said scooped blade, said second pointed portion being used primarily for cutting a small furrow in the ground, said scooped blade, said teeth, said straight portion, said first pointed portion and said second pointed portion being formed of a single integral piece of rigid metal material;
    g) a substantially flat skid having a bent upper edge and a curved lower edge; and
    h) means for adjustably mounting said curved lower edge within said scooped blade adjacent said second pointed portion, so that said skid with said bent upper edge will extend outwardly at an angle therefrom, to lie flat upon the ground for setting a planting depth when said second pointed portion is used for cutting the small furrow in the ground.

2. A four in one gardening tool as recited in claim 1, wherein said adjustable mounting means includes:
    a) said scooped blade having a plurality of holes, spaced apart along said bent central area between said handle assembly and tip of said second pointed portion;
    b) a bolt having a threaded shank with a bent distal end, said bolt affixed to an inner surface of said skid adjacent said curved lower edge, so that said bent distal end extends below said curved lower edge to fit into anyone of said holes; and
    c) a wing nut to engage with said bent distal end of said bolt to retain said skid to said scooped blade.

3. A multiple use gardening tool having a scooped blade with a plurality of side edges adapted, respectively, for different gardening uses and a pointed end portion with a cutting edge extending therefrom, primarily for cutting a small furrow in the ground;
    a) a handle assembly extending upwardly at an angle from a bent central area of said scooped blade;
    b) a substantially flat skid having a bent upper edge and a curved lower edge; and
    c) means for adjustably mounting said curved lower edge of said flat skid within said scooped blade adjacent said pointed end portion, so that said skid with said bent upper edge will extend outwardly at an angle therefrom, to lie flat upon the ground for setting a planting depth when said pointed end portion is used for cutting the small furrow in the ground.

4. A multiple use gardening tool according to claim 3, wherein said adjustable mounting means includes:
    a) said scooped blade having a plurality of holes, spaced apart along a bent central area between said handle assembly and a tip of said pointed, end portion;
    b) a bolt having a threaded shank with a bent distal end, said bolt affixed to an inner surface of said skid adjacent said curved lower edge, so that said bent distal end extends below said curved lower edge to fit into any one of said holes; and
    c) a wing nut to engage with said bent distal end of said bolt to retain said skid to said scooped blade.

* * * * *